US008245256B2

(12) United States Patent
Murthy et al.

(10) Patent No.: US 8,245,256 B2
(45) Date of Patent: Aug. 14, 2012

(54) AUTOSCROLLING THROUGH INTERACTIVE TELEVISION CONTENT

(75) Inventors: Sudhindra Murthy, Irving, TX (US); Lakshmi N Chakarapani, Irving, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 407 days.

(21) Appl. No.: 12/622,243

(22) Filed: Nov. 19, 2009

(65) Prior Publication Data
US 2011/0119714 A1 May 19, 2011

(51) Int. Cl.
*G06F 13/00* (2006.01)
*G06F 3/00* (2006.01)
*H04N 5/445* (2011.01)

(52) U.S. Cl. ............... 725/52; 725/47; 725/61; 715/785

(58) Field of Classification Search ............... 725/47, 725/52, 61; 715/785
See application file for complete search history.

(56) References Cited

U.S. PATENT DOCUMENTS

| 2009/0199238 A1* | 8/2009 | Kummer | 725/39 |
| 2011/0072452 A1* | 3/2011 | Shimy et al. | 725/25 |
| 2011/0209178 A1* | 8/2011 | Barrett | 725/40 |

* cited by examiner

*Primary Examiner* — Hunter B Lonsberry

(57) ABSTRACT

A video client device receives a request for interactive television content. The video client device provides, in response to the request, the interactive television content for display on a video display device. The video client device receives an instruction to initiate an autoscroll function. The video client device retrieves, in response to the instruction, configuration information that identifies a manner for performing the autoscroll function. The video client device performs the autoscroll function to automatically scroll through the interactive television content, in a horizontal direction or a vertical direction, on the video display device based on the configuration information.

23 Claims, 10 Drawing Sheets

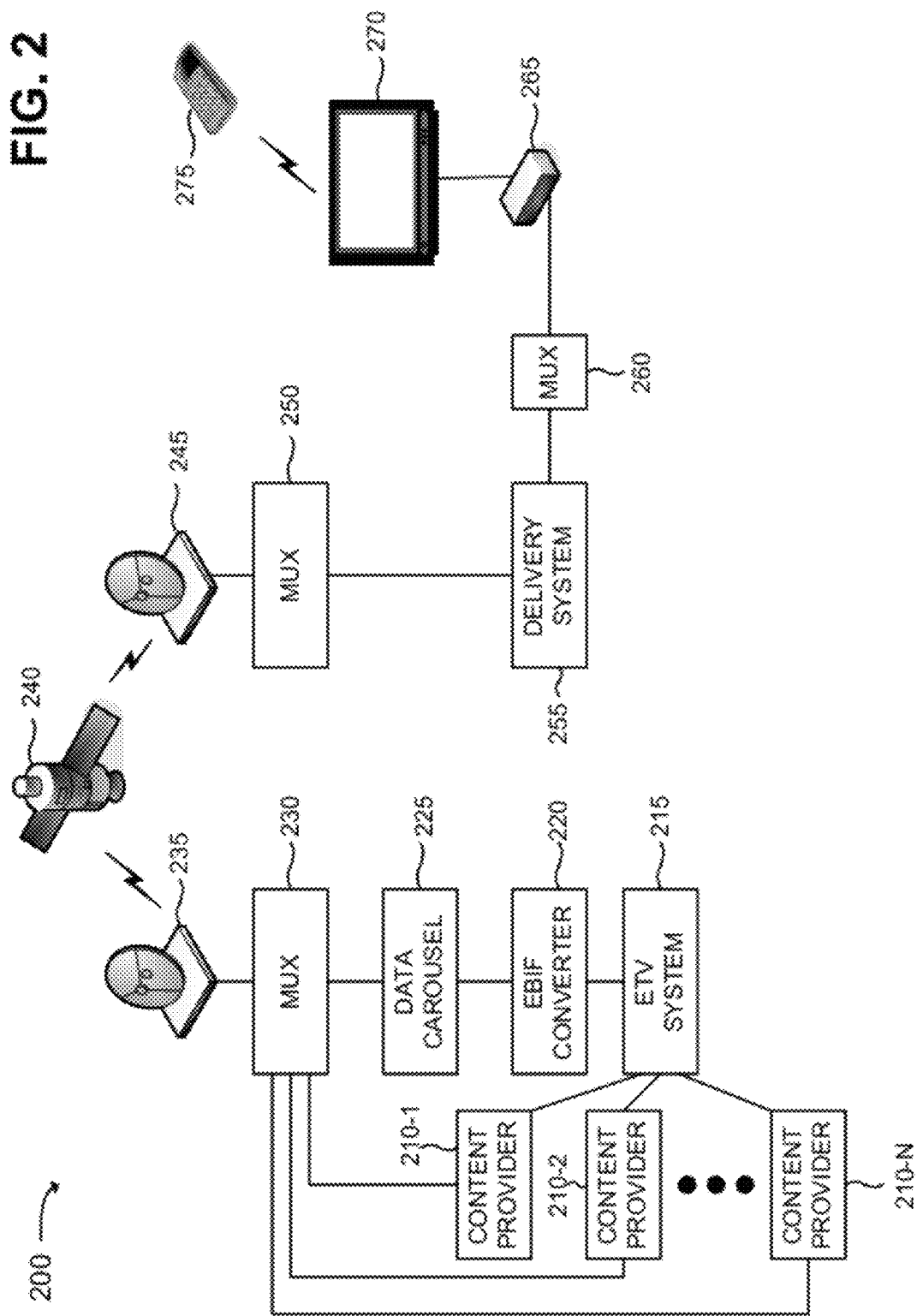

AUTOSCROLLING THROUGH INTERACTIVE TELEVISION CONTENT

BACKGROUND

Television content is ever-changing. It seems that new channels, television programs, and/or features intended to enhance the television viewing experience get introduced every day. As a result, it is becoming increasingly difficult for users to wade through all of the content on television.

Television content providers provide tools, such as program guides and searching functionality, that assist users in finding television content in which the users are interested. These tools can be useful if a user knows the name of the television content and/or the date and time at which that television content is broadcast.

BRIEF DESCRIPTION OF THE DRAWINGS

FIG. 2 is a diagram of an exemplary network in which systems and/or methods described herein may be implemented;

DETAILED DESCRIPTION OF PREFERRED EMBODIMENTS

Figure 1A:
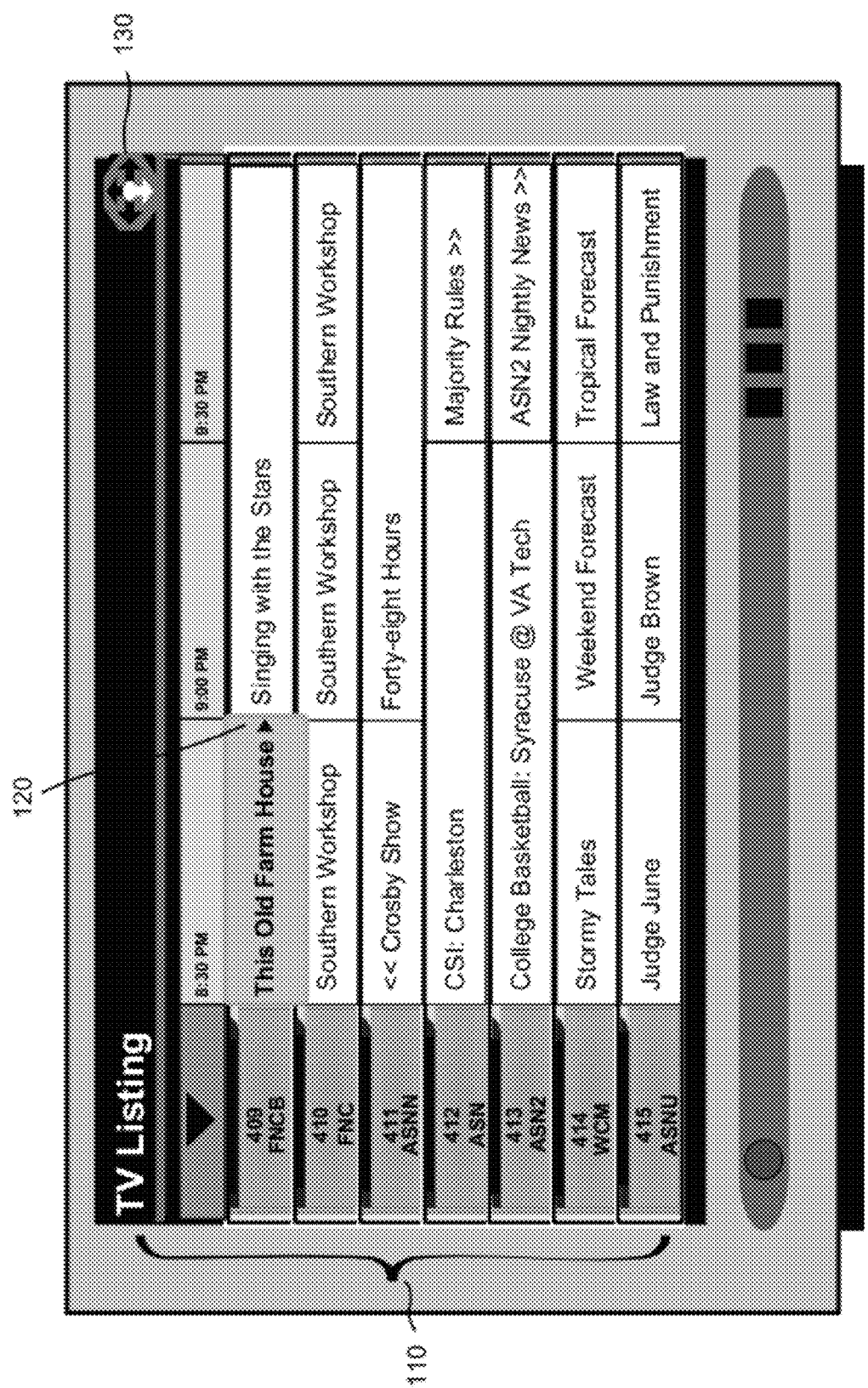
FIGS. 1A and 1B are diagrams that illustrate an overview of an implementation described herein.

The following detailed description refers to the accompanying drawings. The same reference numbers in different drawings may identify the same or similar elements. Also, the following detailed description does not limit the invention.

Implementations described herein may provide an automatic scrolling function that enables a user to automatically scroll through vast amounts of interactive television content in a short amount of time. The term "interactive television content," as used herein, is to be broadly interpreted to include any television content with which a user may interact. Examples of interactive television content may include on-screen television listings (e.g., a list of scheduled television programs, the channels where the television programs may be displayed, and/or the corresponding broadcast time for each television program, etc.), DVR programming schedules, on demand service listings (e.g., video, games, music, etc.), favorites listings, music listings, game listings, bookmarked items listings, program description pages and/or television channels. The automatic scroll function, as described herein, may enable the user to automatically scroll (hereinafter referred to as "autoscroll") through the interactive television content, in either a vertical direction or a horizontal direction, with fewer remote control button clicks and in less time than may be required for manual scrolling.

As one example, during a vertical autoscrolling session, a user may autoscroll vertically downward, at an adjustable speed, within a screen displaying scheduled television content on a number of television channels, in descending order, for a given viewing period (e.g., 8:00 pm to 9:59 pm). Similarly, a user may vertically autoscroll in the upward direction, at an adjustable speed, within a screen displaying scheduled television content on a number of television channels, in ascending order, for a given time period.

As another example, during a horizontal autoscrolling session, a user may autoscroll horizontally in the rightward direction, at an adjustable speed, within a screen displaying scheduled television content, as a function of advancing time, for a given set of television channels (e.g., those television channels visible within the screen displaying television content). Similarly, a user may horizontally autoscroll in the leftward direction, at an adjustable speed, within a screen displaying scheduled television content, as a function of retreating time, for a given set of television channels.

The user may configure and/or enable particular autoscrolling functions, such as the autoscrolling direction (e.g., vertical autoscrolling or horizontal autoscrolling), and/or the autoscrolling speed (e.g., the rate that interactive television content scrolls vertically or horizontally on the display for a given period of time), to suit the user's preference, during an autoscroll set up process. The user may also adjust the autoscroll speed on a real-time basis during an autoscrolling session while autoscrolling vertically or horizontally and/or may stop or dwell to review television content that peeks the user's interests.

As described herein, a user may stop autoscrolling to further consider particular television content, may continue autoscrolling in the same or different direction to explore new television content, and/or may backtrack (e.g., reverse or change autoscrolling direction), to review television content that the user previously perused. If, during an autoscrolling session, the user identifies particular television content that is of interest, the user may select the particular television content to view or the user may review additional information about the particular television content (e.g., in the form of a program description page) and/or may save the particular television content in a bookmark list (e.g., a list of saved television content that the user may choose to review at a later time) before continuing on with the autoscrolling session.

In one implementation, a user may autoscroll through a number of television channels, in ascending or descending order, to peruse individual television programs that are being broadcast (hereinafter, referred to as "channel surfing"). The user may channel surf at an adjustable speed that may be customized to the user's preferences during the autoscroll set up process. The user may also adjust the autoscroll speed, on a real-time basis, while channel surfing and/or may stop or dwell on a particular channel to view the particular television program being shown.

Figure 1B:
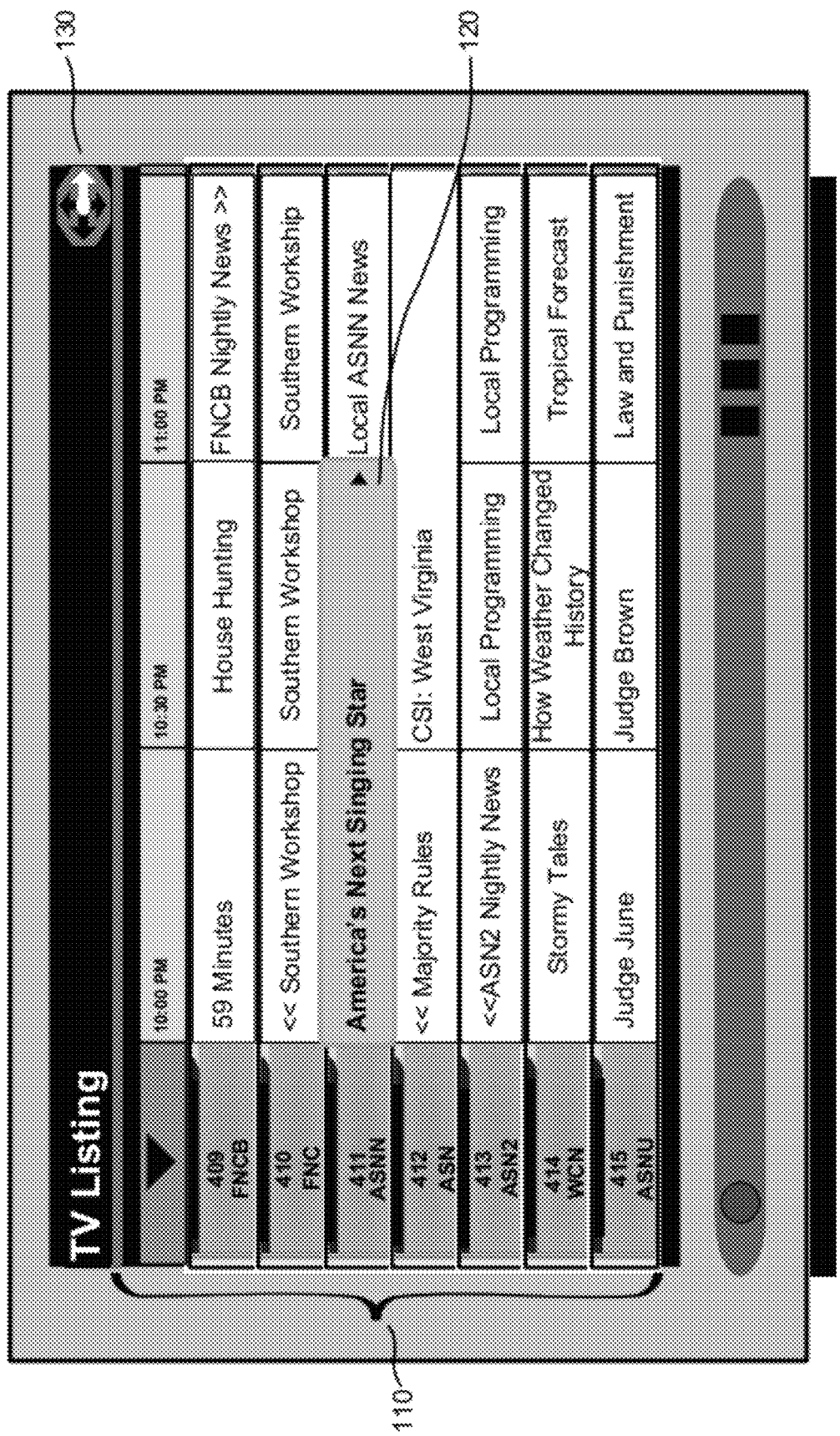

FIGS. 1A and 1B are diagrams that illustrate an overview of an implementation described herein. FIG. 1A is a diagram that illustrates an overview of a vertical autoscrolling implementation and FIG. 1B is a diagram that illustrates an overview of a horizontal autoscrolling implementation. Both FIGS. 1A and 1B will be described below to provide an overview of autoscrolling through exemplary interactive television content (e.g., a television listing) in a vertical direction (e.g., up or down) and horizontal direction (e.g., right or left)

relative to the interactive television content being displayed on a viewing screen (e.g., of a television, a laptop, a computer, a handheld device, etc.).

A user may autoscroll in the vertical direction (e.g. upward or downward) to peruse television content over a number of television channels. For example, as shown in FIG. 1A, on-screen TV listing 110 may be presented in certain situations based on user activity, such as when a user presses one or more buttons on a remote control device. The autoscroll function may be activated by the user or may be automatically activated. The autoscroll function may move selector 120 (e.g., upward or downward) to highlight (e.g., visually distinguish) particular television content (e.g., This Old Farmhouse, Southern Workshop, Crosby Show, etc.). The autoscroll function may move selector 120 vertically downward to highlight television content corresponding to a number of television channels in ascending order (e.g., 409 FNCB, 410 FNC, 411 ASNN, etc.) for a given time period limited to that displayed within the viewing screen (e.g., 8:30 pm to 9:59 pm). Similarly, the autoscroll function may move selector 120 vertically upward to highlight television content in descending order (e.g., 411 ASNN, 410 FNC, 409 FNCB, etc.) for a given time period.

As shown in FIG. 1A, autoscrolling icon 130 may identify the direction selector 120 is moving during a vertical autoscrolling session (e.g., up or down) relative to the television content displayed on the screen. For example, as the autoscroll function moves selector 120 downward (e.g., ascending through the television channels), autoscrolling icon 130 may point in the down position, as illustrated in FIG. 1A.

During vertical autoscrolling, selector 120 may automatically move upward or downward in a fluid and/or continuous manner (hereinafter referred to as "continuous autoscrolling"), at constant speed, on the viewing screen. The continuous vertical autoscrolling speed may be specified by the user during the autoscrolling set up process. In another implementation, rather than moving continuously upward or downward during a vertical autoscrolling session, selector 120 may move in a discrete, non-continuous and/or incremental manner, at non-constant speed, over television content displayed on the viewing screen (hereinafter referred to as "snapping" or "snap autoscrolling"). While autoscrolling in this case, selector 120 may dwell briefly on a program item before accelerating (e.g., snapping) to the next program item, where, again, selector 120 may briefly dwell before moving on. The snap autoscrolling speed may be specified by the user during the autoscrolling set up process.

FIG. 1B is a diagram that illustrates an overview of a horizontal autoscrolling implementation described herein. For example, the autoscroll function may move selector 120 in the horizontal direction (e.g. left or right) to highlight particular television content over an extended period of time for one or a few television channels (e.g., those television channels within the viewing screen displaying the television content). The autoscroll function may move selector 120 in the rightward direction (e.g., advancing in time) from particular television content scheduled from 8:30 pm to 9:00 pm (e.g., This Old Farm House as shown in FIG. 1A); to television content scheduled from 10:00 pm to 11:00 pm (e.g. America's Next Star as shown in FIG. 1B); and/or to television content scheduled hours, days or weeks into the future (not shown in FIG. 1B). Similarly, the autoscroll function may move selector 120 in the leftward direction (e.g., retreating in time) to highlight television content scheduled at earlier times.

Autoscrolling icon 130 may identify the direction selector 120 is moving during a horizontal autoscrolling session (e.g., left or right) relative to the television content displayed on the screen. In the above example, as the autoscroll function moves selector 120 rightward (e.g., advancing in time), auto scrolling icon 130 may point in the right position, as illustrated in FIG. 1B.

During a horizontal autoscrolling session, in a manner similar to that described above, selector 120 may move in a continuous and/or fluid manner (e.g., continuous autoscrolling) or in a discrete, non-continuous and/or incremental manner (e.g., snap autoscrolling). Continuous and/or snap autoscrolling speeds may be specified by the user during the autoscrolling set up process.

In the description to follow, features, elements, procedures and/or operations associated with autoscrolling will be described in terms of autoscrolling relating to interactive television content. It should be understood, however, that the description equally applies to a number of types of content, such as web content, file directories, etc.

FIG. 2 is a diagram of an exemplary environment 200 in which systems and/or methods described herein may be implemented. As shown in FIG. 2, environment 200 may include content providers 210-1, 210-2, . . . , 210-N (where N≧1) (collectively referred to as "content providers 210"), Enhanced Television (ETV) system 215, Enhanced TV Binary Interchange Format (EBIF) converter 220, data carousel 225, multiplexer (MUX) 230, satellite uplink 235, satellite 240, satellite downlink 245, MUX 250, delivery system 255, MUX 260, video client 265, video display device 270, and remote control 275. In practice, environment 200 may include additional, fewer, different, or differently arranged devices than are shown in FIG. 2. For example, environment 200 may include a transmission medium that includes devices other than satellites and satellite uplinks and downlinks.

Also, two or more of these devices may be implemented within a single device, or a single device may be implemented as multiple, distributed devices. Further, while FIG. 2 shows direct connections between devices, any of these connections can be indirectly made via a network, such as a local area network, a wide area network (e.g., the Internet), a telephone network (e.g., the Public Switched Telephone Network (PSTN) or a cellular network), an ad hoc network, a fiber optic network (e.g., a fiber optic service (FiOS) network), or a combination of networks.

Content providers 210 may include any type or form of content providers. For example, content providers 210 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., streaming content from web sites). Content providers 210 may produce media streams (e.g., television broadcasts). A "media stream," as used herein, may refer to stream of content that includes video content, audio content and/or text content.

ETV system 215 may include a device that may work with content providers 210 to generate interactive content for the media streams. ETV system 215 may acquire, decode, present information, and execute actions contained in an EBIF signal in order to present an interactive multimedia page for display to a user. For example, ETV system 215 may generate interactive content and associated signaling information (e.g., triggers) that are associated with the media streams. EBIF converter 220 may include a device that may process the interactive content and associated signaling information to conform to the EBIF standard. EBIF converter 220 may output EBIF-compliant content and signaling information. Data carousel 225 may include a device that may process the EBIF-compliant content and signaling information to generate multiple data carousels on multiple separate data packet identifiers (PIDs) as part of an MPEG-2 single program transport stream (SPTS). For example, a first PID may contain EBIF-compliant content and a second PID may contain the signaling information.

MUX 230 may include a multiplexer device that may receive the media streams from content providers 210 and the EBIF-compliant content and associated signaling information from data carousel 225 and multiplex, or otherwise combine, this data to create an enhanced media stream. Satellite uplink 235 may include a satellite transmitter that may receive the enhanced media stream, process the enhanced media stream for transmission, and transmit the enhanced media stream to satellite 240. Satellite 240 may include a stationary or orbiting communication satellite that may receive the enhanced media stream and relay the enhanced media stream to satellite downlink 245.

Satellite downlink 245 may include a satellite receiver that may receive the enhanced media stream from satellite 240, process the enhanced media stream for transmission, and transmit the enhanced media stream to MUX 250. MUX 250 may include a multiplexer device that may process the enhanced media stream for transmission to delivery system 255.

Delivery system 255 may include a device, or a collection of devices, that may receive the enhanced media stream and process the enhanced media stream for transmission according a particular protocol, such as the asynchronous serial interface (ASI) format. In another implementation, delivery system 255 may work with one or more other devices to generate interactive content and associated signaling information and/or to embed interactive content and associated signaling information into a media stream. MUX 260 may include a multiplexer device that may perform some form of modulation on the enhanced media stream, such as quadrature amplitude modulation (QAM).

Video client 265 may include a device that may receive and process the enhanced media stream from MUX 260. In one implementation, video client 265 may take the form of a set-top box (STB). In another implementation, video client 265 may include a computer device, a cable card, a communication device (e.g., a telephone, such as a voice over Internet protocol (VoIP) telephone or a mobile telephone, or a personal digital assistant (PDA)), or the like.

Video client 265 may perform decoding and/or decryption functions on the enhanced media stream received from MUX 260. Video client 265 may also perform functions associated with autoscrolling and/or processing information associated with displaying television content. Video client 265 may store autoscroll logic and/or software, such as autoscroll control commands (e.g., received from remote control 275) that may enable user commands to be translated and implemented as autoscrolling functionality. Video client 265 may receive, store and/or retrieve autoscroll configuration information that may include information associated with the user, such as a username, personal identification number (e.g. PIN), etc. and/or a user's preferences regarding the autoscrolling function (e.g., the user's preferred autoscrolling operations, speeds, dwell times, continuous/snap autoscrolling, etc.). Video client 265 may also receive, decode, and store information and updates associated with television content in the memory of video client 265. Video client 265 may retrieve stored television content and may process and/or present television content to video display device 270 for display.

Video client 265 may perform other functions, such as DVR functions, relating to the storage and playback of video content. Video client 265 may further perform Internet-based content retrieval functions, such as searching and/or retrieving web pages or other Internet-based content.

Video display device 270 may include any device capable of receiving and/or reproducing video and/or audio signals. In one implementation, video display device 270 may take the form of a television. In another implementation, video display device 270 may include a computer monitor, a display of a communication device (e.g., a telephone, such as a VoIP telephone or a mobile telephone, or a PDA), or the like. Video display 270 may be connected to video client 265 and may receive signals from video client for purposes of displaying television content, autoscrolling, etc.

Remote control 275 may include any device capable of remotely controlling the operation of video client 265 and/or video display device 270. Remote control 275 may take the form of a remote control device similar to a television or STB remote control device, a game controller, a keyboard, a keypad, a PDA, a mobile telephone, or the like. Remote control 275 may provide commands to video client 265 and/or video display device 270 by transmitting signals, such as wireless signals (e.g., infrared or Bluetooth) or signals transmitted over wires (e.g., over a universal serial bus (USB) interface or the like), to a reader associated with video client 265 and/or video display device 270.

Figure 3:
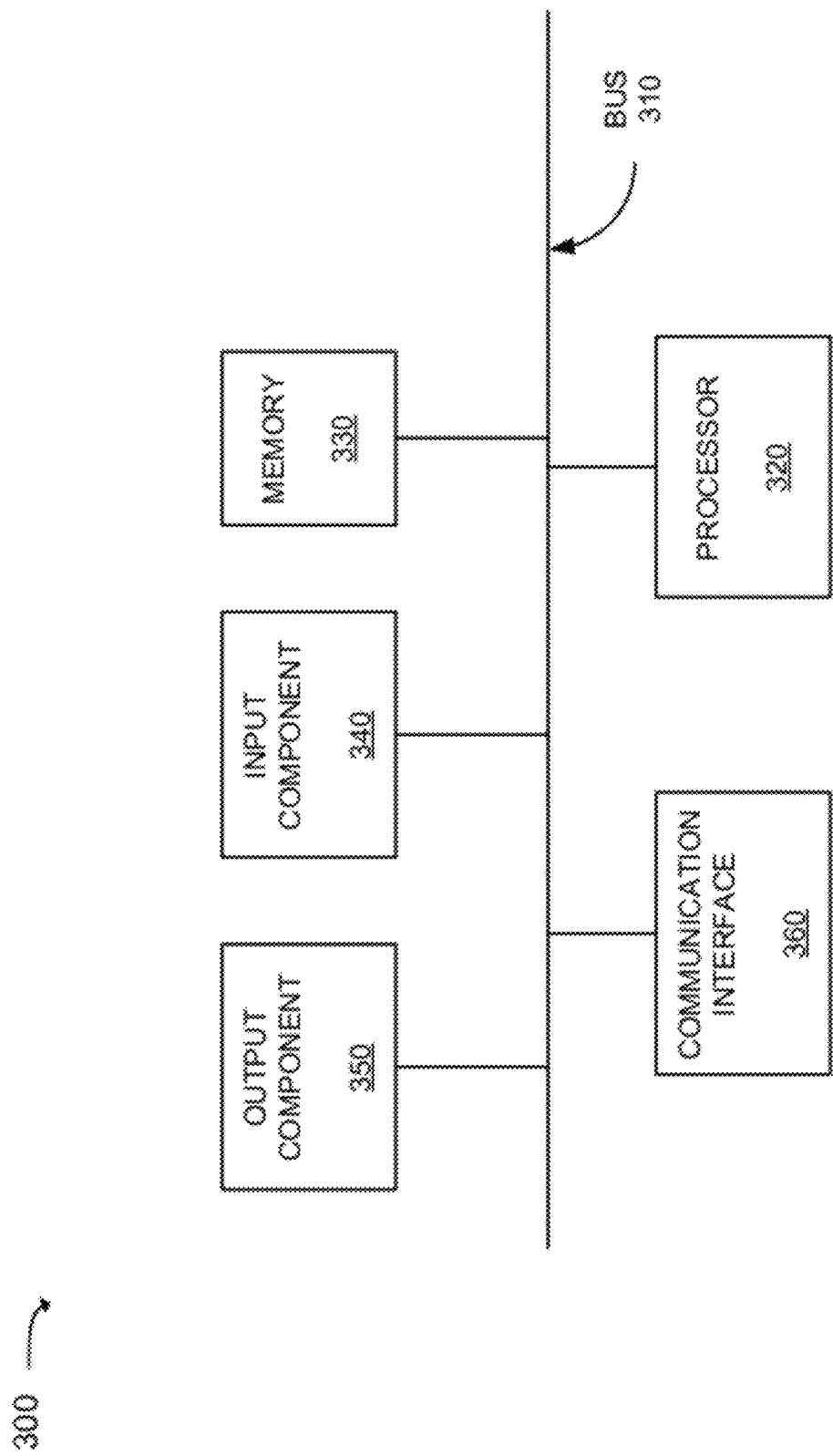
FIG. 3 is a diagram of exemplary components of a device of FIG. 2.

FIG. 3 is a diagram of exemplary components of a device 300. Each of the devices illustrated in FIG. 2 may include one or more devices 300. Device 300 may include a bus 310, a processor 320, a memory 330, an input component 340, an output component 350, and a communication interface 360. In another implementation, device 300 may include additional, fewer, different, or differently arranged components.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits an operator to input information to device 300, such as a keyboard, a keypad, a button, a switch, etc. Output component 350 may include a mechanism that outputs information to the operator, such as a display, a speaker, one or more light emitting diodes (LEDs), etc. Communication interface 360 may include any transceiver-like mechanism that enables device 300 to communicate with other devices and/or systems. For example, communication interface 360 may include an Ethernet interface, an optical interface, a coaxial interface, or the like.

As will be described in detail below, device 300 may perform certain operations relating to autoscrolling through interactive television content. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

The software instructions may be read into memory 330 from another computer-readable medium or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
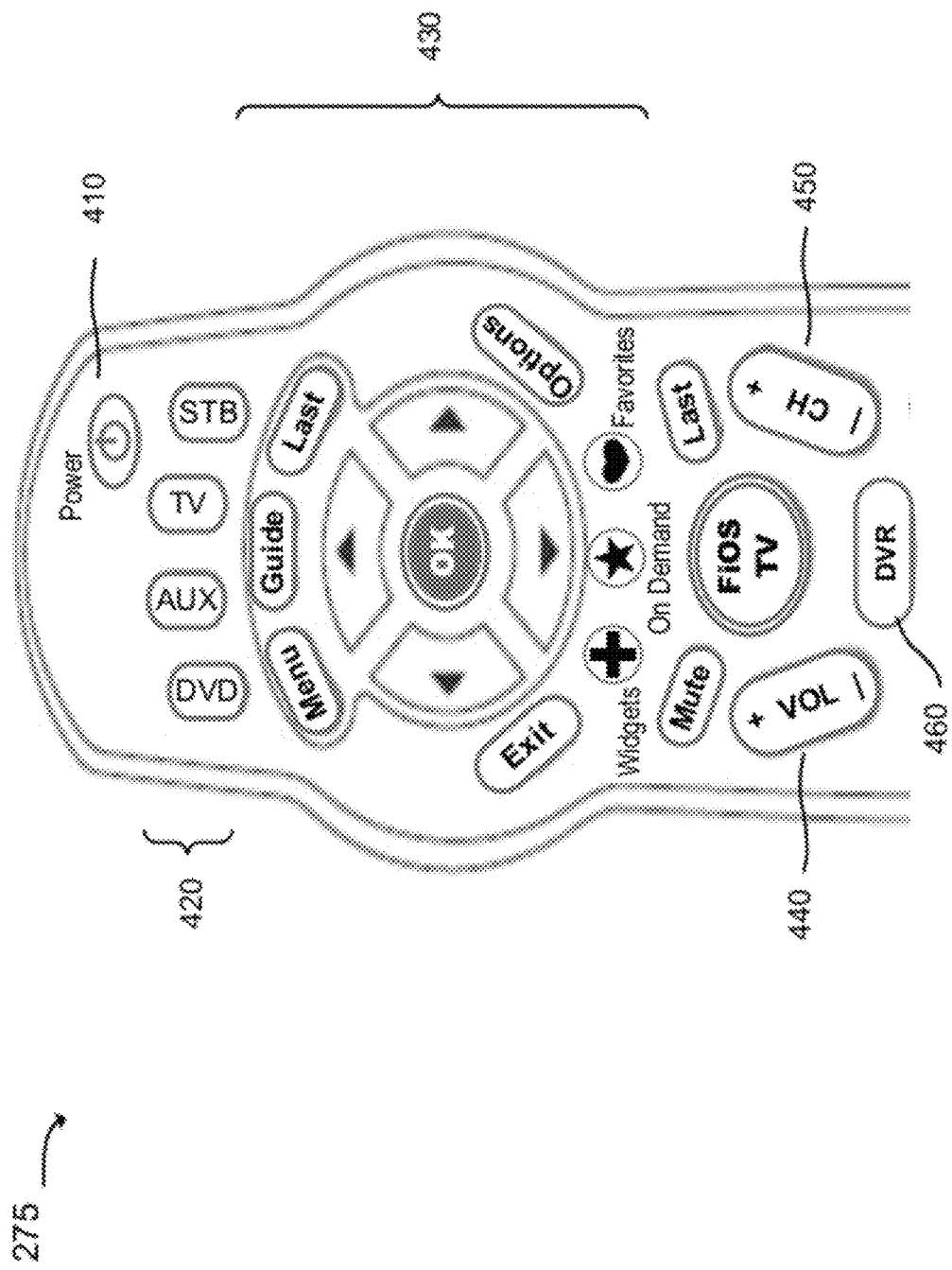
FIG. 4 is a diagram of an exemplary portion of the remote control device of FIG. 2.

FIG. 4 is an exemplary diagram of a portion of remote control 275. As shown in FIG. 4, remote control 275 may include buttons 410-460 that may cause video client 265 and/or video display device 270 to perform various functions. For example, remote control 275 may include a power button 410, device selection buttons 420, interactive content buttons 430, volume button 440, channel button 450, and DVR button 460.

Power button 410 may cause a controlled device (e.g., video client 265, video display device 270, or another device, such as a receiver, a VCR, or a DVR player) to power up or down. Device selection buttons 420 may identify a device to be controlled, such as video client 265, video display device 270, or another device, such as a receiver, a VCR, or a DVR player.

Interactive content buttons 430 may include buttons for displaying and interacting with television content. For example, one or more of buttons 430 may be used to activate or deactivate the autoscrolling function. Volume button 440 may cause a controlled device to change its volume setting. Channel button 450 may cause a controlled device to change its channel setting. DVR button 460 may cause a DVR program schedule to be displayed that may include information associated with television content that the user has selected for recording, play back, etc.

While FIG. 4 illustrates exemplary buttons of remote control 275, in another implementation, a different type of remote control device may be used to cause video client 265 and/or video display device 270 to perform various functions associated with autoscrolling through interactive television content. In another implementation, a user may control video client 265 and/or video display device 270 by pressing certain buttons on one or both devices (e.g., video client 265 and/or video display device 270) and/or another communication or control device. In yet another implementation, a computer, a cellular/mobile phone, a personal digital assistant (PDA) and/or another device capable of wireless communications (e.g., infrared, Bluetooth and/or other wireless capabilities) may control video client 265 and/or video display device 270.

Figure 5:
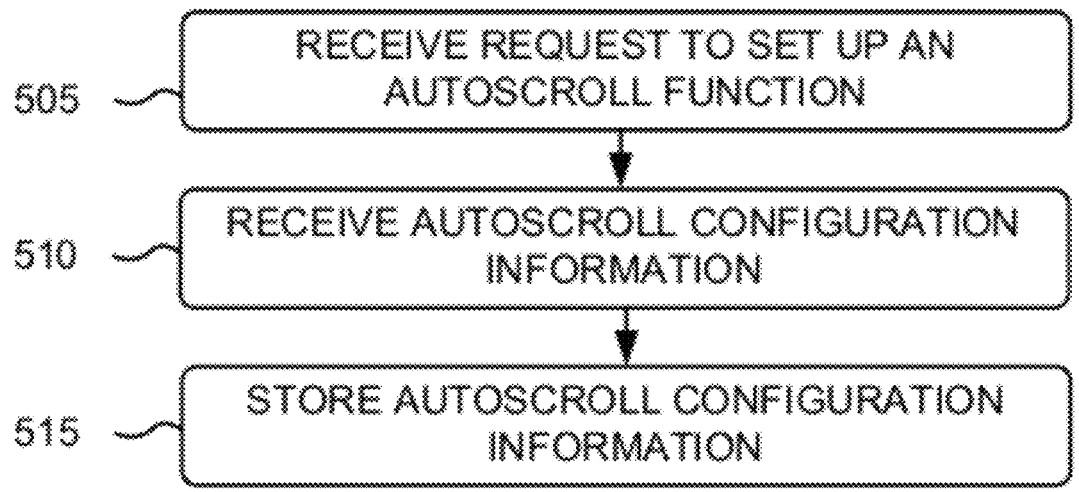
FIG. 5 is a flowchart of an exemplary process for setting up an autoscroll function within an exemplary portion of the environment of FIG. 2.
Figure 6:
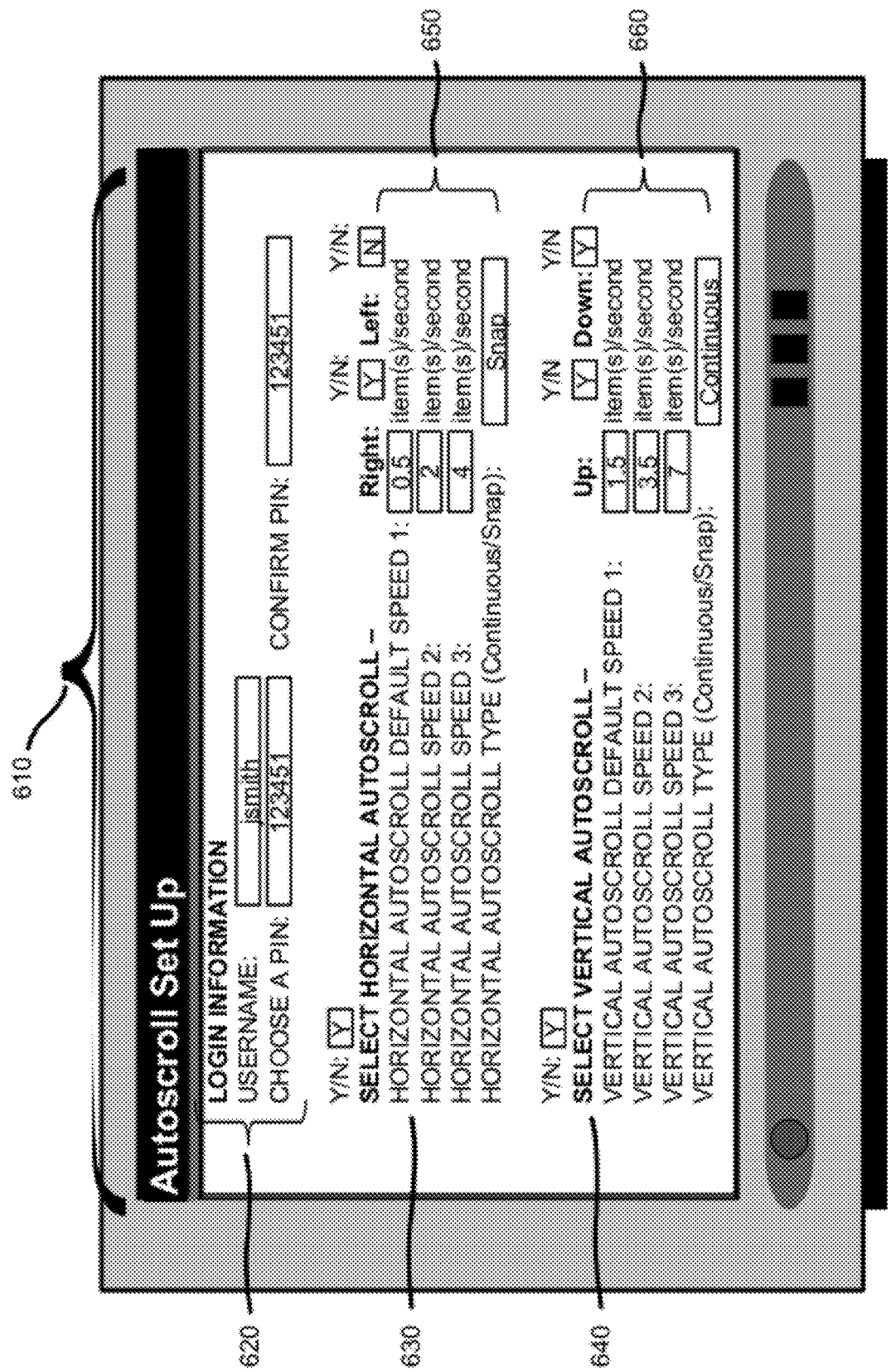
FIG. 6 is a diagram of an exemplary autoscroll set up user interface capable of being presented on the video display device of FIG. 2.

FIG. 5 is a flowchart of an exemplary process 500 for setting up an autoscroll function. In one implementation, some or all of process 500 may be performed by video client 265 interfacing with remote control 275, video display device 270 and/or other exemplary portions of environment 200. In another implementation, some or all of process 500 may be performed by one or more devices separate from, or in combination with, video client 265. FIG. 6 is a diagram of an exemplary autoscroll set up user interface. All or a portion of process 500, of FIG. 5, will be discussed below with corresponding references to FIG. 6.

Process 500, of FIG. 5, may include receiving a request to set up an autoscroll function (block 505). For example, a user (e.g., a user of video client 265) may request to set up the autoscrolling function by pressing a particular button or series of buttons on remote control 275 (e.g., the options button 430 (FIG. 4)). In response to the user's request, remote control 275 may send, in the form of a signal, the request to set up the autoscrolling function to video client 265. Video client 265 may receive the request to set up the autoscrolling function and may retrieve from memory, information associated with the autoscrolling function set up and/or information associated with assembling the autoscrolling set up user interface (e.g., the autoscroll set up user interface of FIG. 6) for display by video display device 270.

The autoscrolling set up user interface may enable a user to set up the autoscrolling function in accordance with the user's preferences. In one implementation, the user (e.g., the user of video client 265) may set up the autoscrolling function by logging in (e.g., providing a username, password and/or PIN, etc.) to enable video client 265 to associate the user's autoscrolling preferences with the particular user. Alternatively, video client 265 may permit the user to provide preferences that are not tied to a particular user (e.g., the set preferences are common to all users of video client 265).

The user may enable particular autoscrolling functions, such as whether vertical autoscroll and/or horizontal autoscroll are enabled; whether the autoscroll function is automatically activated upon the occurrence of certain events (e.g., when a user requests interactive television content); particular autoscrolling directions (e.g., up and/or down, if the vertical autoscrolling function is enabled; right and/or left, if the horizontal autoscrolling function is enabled; etc.); autoscrolling types for each autoscrolling function (e.g., continuous autoscroll versus snap autoscroll); and/or autoscrolling speeds for each autoscrolling function enabled by the user. The user may define one or more autoscrolling speeds in the horizontal directions as a function of time for a given set of channels (i.e., if the horizontal autoscrolling function is enabled by the user); and/or one or more autoscrolling speeds in the vertical directions as a function of ascending or descending television channels for a given period of time (i.e., if the vertical autoscrolling function is enabled by the user).

For example, as shown in FIG. 6, an autoscrolling set up user interface 610 may be presented to the user. User interface 610 may receive particular preferences regarding the autoscrolling function. While FIG. 6 shows particular preferences that may be configured by a user, in other implementations, fewer, additional, or different preferences may be configured. For example, if the autoscroll functions are not tailored to a particular user, then user interface 610 need not request a user to provide any information identifying the user. Additionally, or alternatively, a user may be permitted to configure the autoscroll function to automatically activate upon the occurrence of certain events (which may be selected or identified by the user). Additionally, or alternatively, a user may be able to configure the autoscroll function to temporarily pause (e.g., for some user-configurable amount of time) during a scrolling process if a highlighted item of content matches an item in a user's favorites or bookmarks.

As shown in FIG. 6, user interface 610 may include information associated with the user 620 (e.g., the user of video client 265 login information, such as username "jsmith", PIN "123451," etc.); the user's preferences regarding whether to enable the horizontal autoscrolling function 630 (e.g., yes— "Y"); and/or the user's preference regarding whether to enable the vertical autoscrolling function 640 (e.g., yes— "Y"). It should be understood that the user may choose to enable either vertical or horizontal autoscrolling functions, both vertical and horizontal autoscrolling functions, or neither vertical nor horizontal autoscrolling functions.

If the user chooses to enable the horizontal autoscrolling function 630, then autoscrolling set up user interface 610 may prompt the user to provide horizontal autoscrolling preferences 650, such as horizontal autoscrolling directions (e.g., right: yes—"Y" and/or left: no—"N"); horizontal autoscroll speeds, such as a horizontal autoscroll default speed one (e.g., "0.5" items of television content per second), horizontal autoscroll speed two (e.g., "2" items per second), horizontal autoscroll speed three (e.g., "4" items per second), etc.; and/or horizontal autoscrolling type, such as continuous horizontal autoscrolling or snap horizontal autoscrolling (e.g., "Snap"), as described above (FIGS. 1A and 1B).

Similarly, if the user chooses to enable vertical autoscrolling function 640, then autoscrolling set up user interface 610 may prompt the user to provide vertical autoscrolling preferences 660, such as vertical autoscrolling directions (e.g., up: yes—"Y" and/or down: yes—"Y"); vertical autoscroll speeds, such as a vertical autoscroll default speed one (e.g., "1.5" items of television content per second), vertical autoscroll speed two (e.g., "3.5" items per second), vertical autoscroll speed three (e.g., "7" items per second), etc.; and/or vertical autoscrolling type, such as continuous vertical autoscrolling or snap vertical autoscrolling (e.g., "continuous"), as described above (FIGS. 1A and 1B).

Autoscrolling speeds may be specified by the user when setting up the autoscrolling function. For example, autoscroll speeds may be set up by the user (e.g., the user of video client 265), such that default autoscrolling speed one may represent the autoscrolling speed in a particular direction (e.g., up, down, right or left) when autoscrolling is initially activated by the user (e.g., when the user starts an autoscrolling session by pressing a particular button on remote control 275 (FIG. 4)). Autoscrolling speed two, three and/or other autoscrolling speeds may be activated by the user (e.g., by pressing a button on remote control 270). Furthermore, the user may set up autoscrolling speed two, three and/or other autoscrolling speeds to be faster or slower than autoscrolling default speed one. It should be understood that, while autoscrolling set up user interface 610 of FIG. 6 shows three autoscroll speeds for horizontal autoscroll and three autoscroll speeds for vertical autoscroll speeds, in practice, there may be additional, fewer or different autoscroll speeds.

Autoscrolling speeds, as used herein, may be defined as the amount of television content highlighted by selector 120 (FIGS. 1A and 1B) within a given period of time. In one implementation, autoscrolling speeds may be specified as the number of items of television content (e.g., "America's Next Star" of FIG. 1B) highlighted by selector 120 per second. For example, as shown in FIG. 6, the horizontal autoscroll default speed one, of 0.5 items per second 650, may enable selector 120 to highlight each item of television content for approximately two seconds, such that within a ten second horizontal autoscrolling interval, five items may be highlighted by selector 120. In another example, the horizontal autoscrolling speed three 650 (FIG. 6) of four items per second may enable selector 120 to highlight forty items within a ten second interval.

Furthermore, while exemplary autoscrolling speeds, as discussed herein, refer to the number of items of television content highlighted by selector 120 in one second, in another implementation, autoscrolling speeds may be defined as the number of items highlighted in an amount of time that is different than one second (e.g., five seconds, ten seconds, one minute, etc.). In other implementation, rather than define autoscrolling speeds as the number of items highlighted within a given period of time, autoscrolling speeds could be defined as the number on-screen pages of television content (e.g., the text associated with a program description page) reviewed within a given period of time.

In yet another implementation, the autoscroll speed could be specified by dwell time, such as the amount of time selector 120 dwells over a particular item of television content before moving to new item of television content. Alternatively or additionally, autoscroll speed could be specified by dwell time, such as the amount of time a particular item of television content (e.g., the text associated with a program description page) is displayed before a new item of television content is displayed. In other implementations, autoscrolling speeds may be specified by the number of time periods displayed on screen within a given period of time, and/or the number of television channels displayed on screen within a given period of time, etc.

Autoscroll configuration information may be received (block 510) and the received autoscroll configuration information may be stored (block 515). For example, video client 265 may receive autoscroll configuration information and may store the received autoscroll configuration information in video client 265 memory. The stored autoscroll configuration information may be retrieved by video client 265 when the autoscroll function is activated (e.g., when the user presses a particular button, or series of buttons, on remote control 275). Furthermore, the user may revise configuration information by enabling or disabling autoscrolling functions as needed, adding and/or removing autoscrolling directions and/or modifying autoscrolling speeds or types (e.g., snap or continuous).

Figure 7:
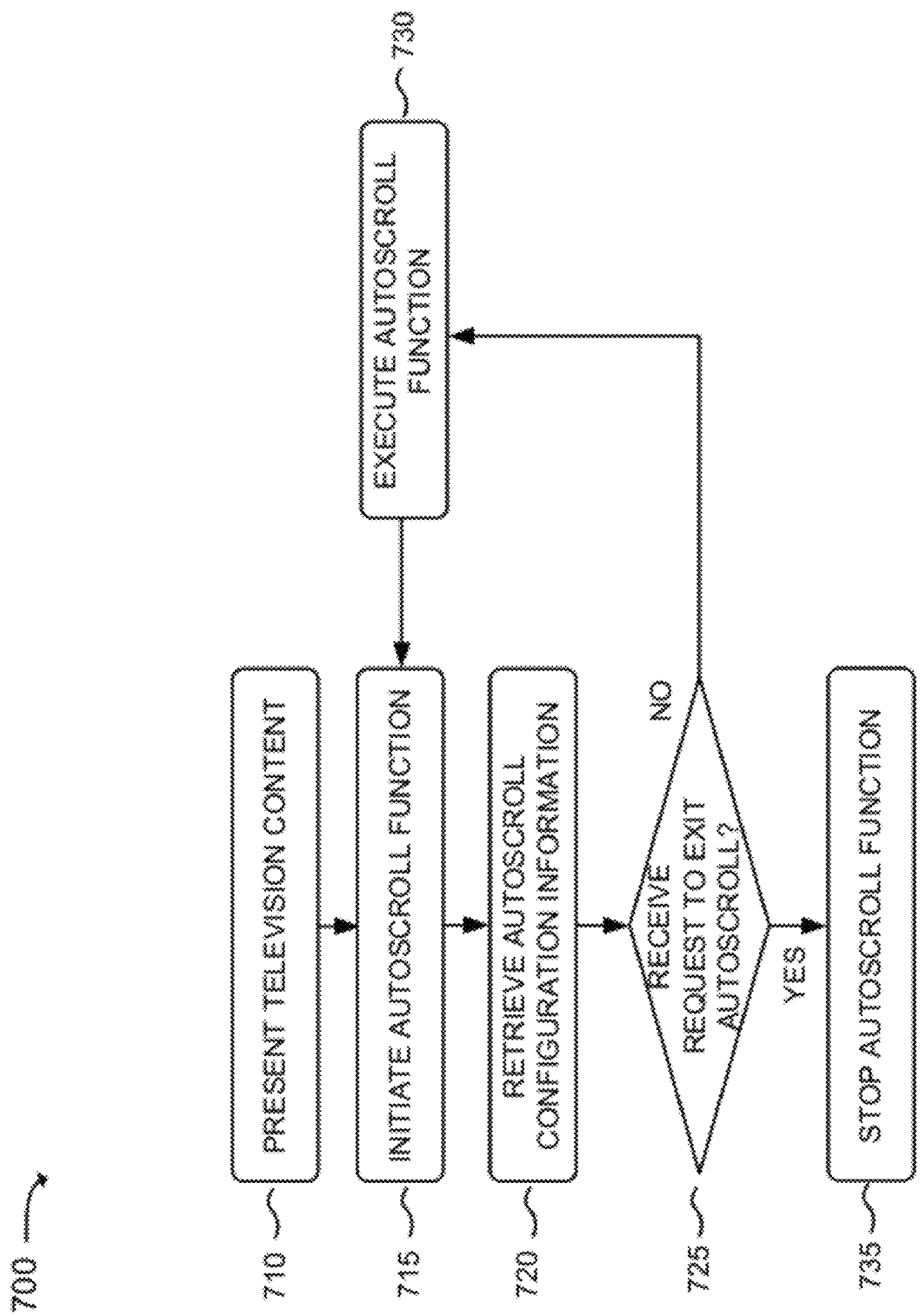
FIG. 7 is a flowchart of an exemplary process for interacting with and using autoscroll functions within an exemplary portion of the environment of FIG. 2.

FIG. 7 is a flowchart of an exemplary process 700 for interacting with and using the autoscroll function. In one implementation, some or all of process 700 may be performed by video client 265 interfacing with remote control 275, video display device 270 and/or other exemplary portions of environment 200. In another implementation, some or all of process 700 may be performed by one or more devices separate from, or in combination with, video client 265.

Interactive television content may be presented (block 710). For example, video client 265 may receive a request from a user (e.g., a user of video client 265) to view interactive television content, such as television listing 110 of FIGS. 1A and 1B. Video client 265 may receive the request to view television content and may present the interactive television content on video display device 270.

The autoscroll function may be initiated (block 715) and autoscroll configuration information may be retrieved (block 720). For example, the autoscroll function may be automatically initiated when a particular event occurs (e.g., a request to present interactive television content is received). Alternatively, the user (e.g., the user of video client 265) may initiate the autoscroll function by pressing a particular button on remote control 275, such as a directional button 430 (FIG. 4). Video client 265 may receive a request to initiate the autoscrolling function, via a signal received from remote control 275 in response to the user pressing the particular button to initiate the autoscroll function. In response to the request, video client 265 may retrieve, from memory (e.g., a memory associated with video client 265), autoscroll configuration information.

If a request to exit the autoscroll function is not received (block 725—NO), then the autoscroll function may be executed (block 730). For example, video client 265 may determine whether the request received from the user (e.g., the user of video client 265), via remote control 275, is a request to exit the autoscroll function. Assume that video client 265 determines that the request was not a request to exit the autoscroll function, but rather that the received signal is a request to autoscroll in the vertical down direction. Video client 265 may determine from the user's configuration information that the user has enabled the vertical autoscroll function, (e.g., as shown at 640 of FIG. 6) and that the user has enabled autoscrolling in the down direction (e.g., at a vertical autoscroll speed one of 1.5 television programs per second 660 (FIG. 6)). Accordingly, video client 265 may execute the vertical autoscroll request to autoscroll downward at autoscroll default speed one, in accordance with the user's autoscroll configuration information (e.g., as shown FIG. 6). Video client 265 may send information to video display device 270 causing selector 120 to autoscroll vertically downward through displayed items of television content at the autoscroll default speed one, as specified by the user.

In another example, video client 265 may receive another autoscroll request from the user and, in a manner similar to that described above, video client 265 may determine that the user desires to autoscroll in the vertically downward direction at autoscroll speed two. Video client 265 may determine from the user's configuration information that the user has specified a particular vertical autoscroll speed two (e.g., a rate of 3.5 television programs per second as shown at 660 (FIG. 6)). Accordingly, video client 265 may execute the vertical autoscroll request to autoscroll downward at autoscroll speed two in accordance with the user's autoscroll configuration information (e.g., as shown FIG. 6). Video client 265 may send information to video display device 270 causing selector 120 to autoscroll vertically downward through displayed items of television content at the autoscroll speed two as specified by the user.

In yet another example, video client 265 may receive an autoscroll request from the user and, in a manner similar to that described above, video client 265 may determine that the user desires to autoscroll in the horizontal right direction and video client 265 may determine from the user's configuration information that the user has enabled horizontal autoscroll function, (e.g., as shown at 630 of FIG. 6). Furthermore, video client 265 may determine that the user has enabled horizontal autoscrolling in the rightward direction (e.g., at a horizontal autoscroll speed one of 0.5 television programs per second 650 (FIG. 6)). Accordingly, video client 265 may execute the horizontal autoscroll request to autoscroll rightward at autoscroll default speed one, in accordance with the user's autoscroll configuration information (e.g., as shown FIG. 6). Video client 265 may send information to video display device 270 causing selector 120 to autoscroll horizontally rightward through displayed items of television content at the autoscroll default speed one as specified by the user.

If a request to exit the autoscroll function is received (block 725—YES), then the autoscroll function may stop (block 735). For example, video client 265 may receive an autoscroll request from the user and video client 265 may determine whether the request received from the user is a request to exit the autoscroll function. If video client 265 determines that the received signal is a request to exit the autoscroll function (e.g., the user may have pressed a particular button, or series of buttons on remote control 275), video client 265 may stop autoscrolling. Video client 265 may send information to video display device 270 causing selector 120 to stop moving and/or to remain stationary.

In another example, video client 265 may receive an autoscroll request from the user and, in a manner similar to that described above, video client 265 may determine that the user desires to autoscroll in the horizontal left direction. Video client 265 may determine from the user's configuration information that the user has enabled the horizontal autoscroll function, (e.g., as shown at 630 of FIG. 6). However, video client 265 may determine from the user's configuration information that the user has not enabled horizontal autoscrolling in the leftward direction. Accordingly, video client 265 may not execute the horizontal autoscroll request to autoscroll in the leftward direction in accordance with the user's autoscroll configuration information (e.g., as shown FIG. 6). Furthermore, in a manner similar to that described immediately above, video client 265 may stop autoscrolling. Video client 265 may send information to video display device 270 causing selector 120 to stop moving and/or to remain stationary.

In an alternative implementation, video client 265 may ignore the horizontal autoscroll command in the leftward direction, if the user has not enabled that particular horizontal autoscrolling function. Video client 265 may not stop autoscrolling; rather, video client 265 may continue to autoscroll in the same direction and/or at the same speed as if the command to execute a disabled autoscrolling function was never received.

Process 700 may differ when the interactive television content corresponds to television channels. In this case, a request to autoscroll through television channels may be received. For example, video client 265 may receive a request from a user (e.g., a user of video client 265) to autoscroll through television content that may be comprised of television channels that are being broadcast (e.g., channel surfing) on video display device 270. Video client 265 may receive the request to channel surf and may retrieve, from memory (e.g., a memory associated with video client 265), autoscroll configuration information.

The request to channel surf may be executed. For example, video client 265 may determine, that the request received from the user (e.g., the user of video client 265), via remote control 275, may be a request to channel surf Furthermore, video client 265 may determine, from the user's configuration information, whether the user has enabled the channel surfing autoscroll function. Video client 265 may determine whether the user has enabled autoscrolling in the up and/or the down direction (e.g., ascending through television channels and/or descending through television channels, respectively), what channel surfing default speed, and/or other speeds are specified by the user. For example, video client 265 may determine from the user's configuration information, that the user has enabled a channel surfing function in both up and down directions with a particular default channel surfing speed (e.g., a channel dwell time of one television channel every three seconds). Accordingly, video client 265 may execute the channel surfing request in accordance with the user's autoscroll configuration information. Video client 265 may send information to video display device 270 causing television channels to be displayed for a particular amount of time (e.g., for three seconds) before changing to the next television channel in ascending or descending order depending the user's request and the user's configuration information.

It should be understood that channel surfing speeds may be described in a number of ways including dwell time (e.g., the amount of time a television channel will be displayed before changing) and/or channel autoscrolling speed (e.g., number of channels displayed within a given period of time, such as one second, ten seconds, one minute, etc.).

A request to exit the channel surfing function may be received. For example, video client 265 may receive an autoscroll request from the user, (e.g., via a signal received from remote control 275) when the user presses a particular button on remote control 275. Video client 265 may determine whether the request received from the user is a request to exit the channel surfing function. If video client 265 determines that the received signal is a request to exit the channel surfing function, then video client 265 may stop channel surfing.

Video client 265 may send information to video display device 270 causing the television channels to stop changing.

Figure 8A:
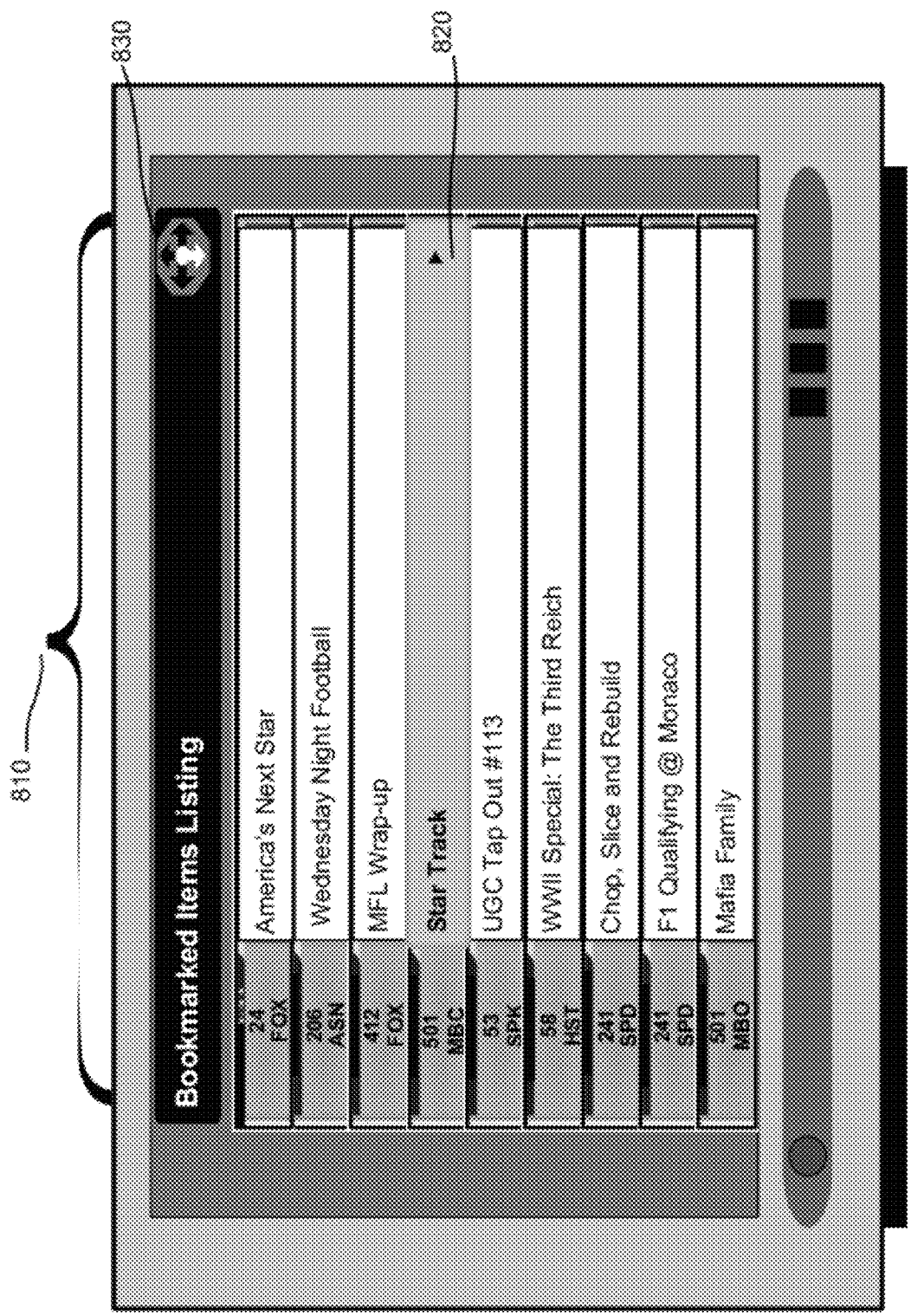
FIGS. 8A and 8B are diagrams that illustrate exemplary autoscroll functions within television content capable of being presented on the video display device of FIG. 2.
Figure 8B:
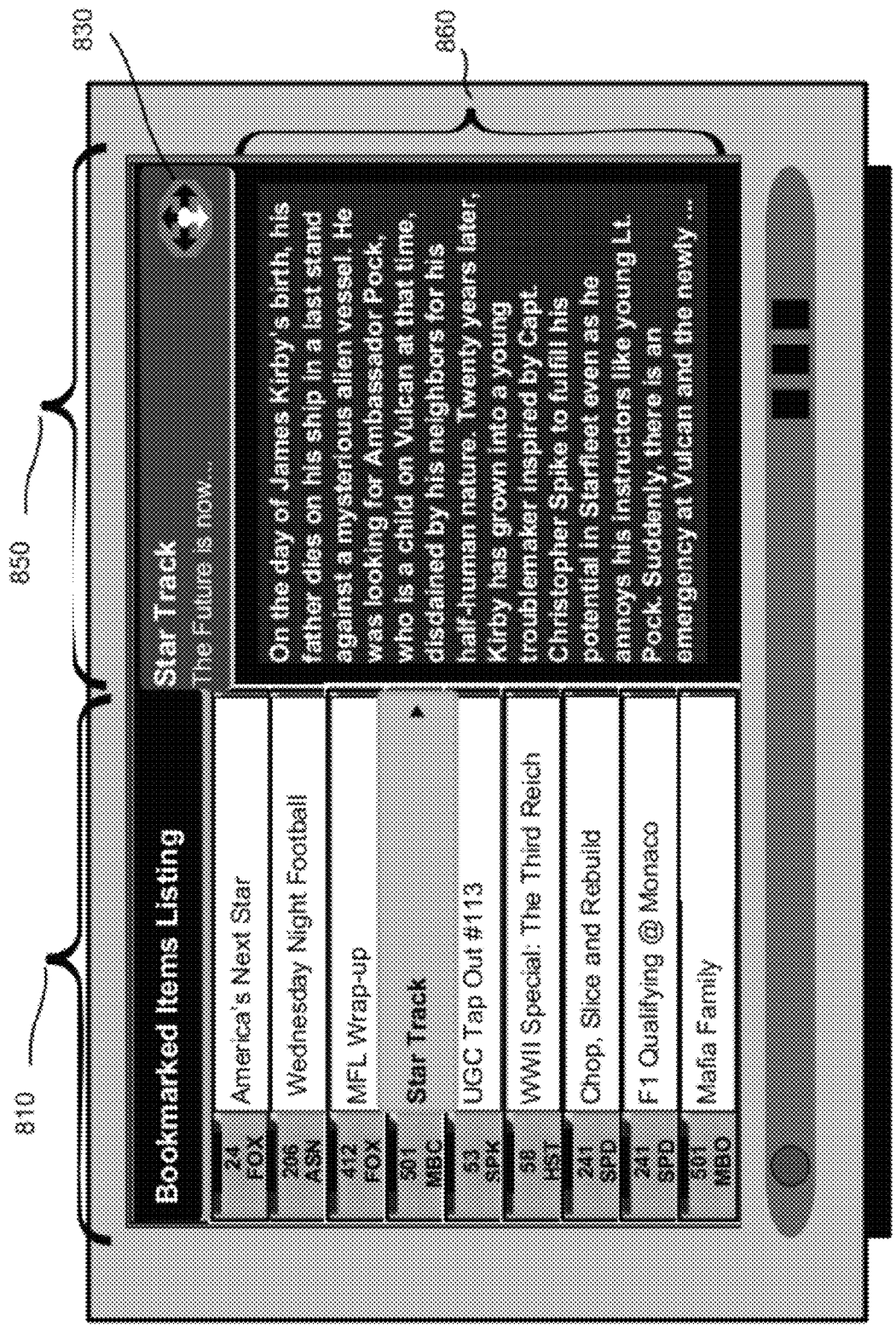

FIGS. 8A and 8B are diagrams that illustrate autoscroll functions within exemplary items of television content. FIG. 8A is a diagram that illustrates a vertical autoscrolling implementation within items of television content comprising a bookmarked items list. FIG. 8B is a diagram that illustrates a vertical autoscrolling implementation within items of television content comprising a program description page. Both FIGS. 8A and 8B will be described below to provide an overview of vertical autoscrolling functionality such as autoscrolling direction (e.g., up and/or down), autoscrolling speeds in a vertical direction, relative to differing television content, such as a list of television programs or a textual description of a television program being displayed on a viewing screen.

As shown in FIG. 8A, television content, such as a bookmarked items list may be presented. For example, in a manner similar to that described above (at block 710 of FIG. 7), video client 265 may receive a request from a user (e.g., a user of video client 265) to present television content, such as a bookmark items listing 810. Bookmarked items listing 810 may include television content, such as television programs that the user previously saved to video client 265 memory to be reviewed at a later time. Video client 265 may retrieve, from memory, particular television content (e.g., bookmark items listing 810) and may send information associated with the particular television content to video display device 270 for display.

The user may vertically autoscroll to particular television content to review a program description page. For example, in a manner similar to that described above (at blocks 715-730 of FIG. 7), video client 265 may retrieve autoscroll configuration information and may cause program selector 820 to vertically autoscroll downward (e.g., autoscroll direction 830 may point in the down direction) in accordance with the enabled autoscroll functions set up by the user. In a manner similar to that described above at blocks 725-YES and 735 of FIG. 7, the user may pause selector 820 (e.g., stop autoscrolling) over particular television content, such as a bookmarked television program (e.g., "Star Track," which is being broadcast on channel 501 MBC), as shown in FIG. 8A, to review a program description page associated with the highlighted television program.

As shown in FIG. 8B, television content, such as a program description page may be presented. For example, in a manner similar to that described above (at blocks 710 and 715 of FIG. 7), a request to present television content may be received and autoscrolling may be initiated. Video client 265 may receive a request to present program description page 850 and may retrieve from memory, information associated with the selected bookmarked television program (e.g., Star Track) for display by video display device 270. Video client 265 may receive a request to initiate vertical autoscrolling and video client 265 may cause vertical autoscrolling to commence in accordance with enabled vertical autoscrolling functions, as specified by the user's autoscrolling configuration information, retrieved from memory. The user may vertically autoscroll in a downward or upward direction to review the program description page text 860. While autoscrolling downward through the program description text 860, the autoscrolling indicator may point in the down direction 830.

In one implementation, the continuous vertical autoscrolling speed within television content displayed in textual form (e.g., the text of a program description page) may differ from the continuous autoscrolling speed associated within a list of television content, such as a bookmark list and/or television listing. For example, a continuous vertical autoscrolling speed could be defined as the number of lines of text that enter the display within a given period of time. Thus, for example, the user may set up the continuous vertical autoscroll function to enable one line of new text to be displayed every two seconds (e.g., 30 lines of text may be displayed in a period of 60 seconds). In another example, a continuous vertical autoscrolling speed associated with a page of television content text could be defined as a function of the number of alpha numeric characters that enter the display within a given period of time.

In another implementation, the snap vertical autoscrolling speed within television content displayed in textual form may differ from the snap autoscrolling speed associated within a list of television content, such as a bookmark list and/or television listing. For example, a snap vertical autoscrolling speed could be defined by the dwell time of a particular program description page of text (e.g., program description page 860) before a new page of text is displayed by video client 265. For example, the dwell time associated with a page of text may be defined by a specified period of time for each line of text within the page of text (e.g., a dwell time of two seconds for every line of text within a particular page). Thus, for example, a page of text comprising 30 lines may be displayed for 60 seconds, whereas a page of text comprising 15 lines may be displayed for only 30 seconds before a new page of test is displayed by video client 265. Alternatively, a snap vertical autoscrolling speed could be defined as the dwell time associated with a page of television content text as a function of the number of alpha numeric characters that comprise the page of text.

Implementations described herein may provide an autoscroll function that scrolls through interactive television content on a screen of a video display device. The autoscroll function may be set up and/or configured to suit a user's particular preferences. The autoscroll function may enable the user to scroll automatically through interactive television content in a horizontal (e.g., left or right) and/or vertical (e.g., up or down) direction, at a speed tailored to the user.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 7, the order of the blocks may be modified in other implementations. Further, non-dependent blocks may be performed in parallel.

Also, while the autoscroll function has been described, at times, with reference to movement of a selector (e.g., selector 120), the autoscroll function may performing an automatic scrolling operation that is completely independent of the selector.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a device, a request for interactive television content;
    providing, by the device and based on the request, the interactive television content to a display device;
    receiving, by the device, an instruction to initiate an autoscroll function;
    retrieving, by the device and based on the instruction, configuration information that specifies whether automatic scrolling, based on the autoscroll function, is performed in a continuous manner or a non-continuous manner; and
    performing, by the device, the automatic scrolling through the interactive television content in the continuous manner or the non-continuous manner based on the configuration information.

2. The method of claim 1,
    where the interactive television content includes a list of television content, and
    where performing the automatic scrolling includes automatically scrolling through the list of television content in a horizontal direction or a vertical direction.

3. The method of claim 1,
    where the configuration information further specifies a speed for automatic scrolling, and
    where performing the automatic scrolling includes automatically scrolling through the interactive television content at the speed.

4. The method of claim 1, further comprising:
    receiving a particular instruction to change a direction of the automatic scrolling to a different direction; and
    automatically scrolling through the interactive television content in the different direction based on the particular instruction.

5. The method of claim 1,
    where performing the automatic scrolling includes automatically scrolling through the interactive television content in a first direction, and
    where the method further comprises:
        receiving a particular instruction to change a direction of the automatic scrolling to a second direction; and
        automatically scrolling through the interactive television content in the second direction based on the particular instruction,
    where the first direction is a vertical direction, and
    where the second direction is a horizontal direction.

6. The method of claim 1,
    where the interactive television content includes a list of items,
    where the instruction identifies a direction for the automatic scrolling, and
    where performing the automatic scrolling includes:
        moving a selector from item-to-item, of a plurality of items within the list of items, in the direction.

7. The method of claim 1, where receiving the instruction to initiate the autoscroll function includes:
    receiving the instruction from a remote control device after a user pushes a button of the remote control device.

8. The method of claim 1, where receiving the instruction to initiate the autoscroll function includes:
    detecting an occurrence of a particular event, and
    generating the instruction to initiate the autoscroll function based on the occurrence of the particular event.

9. The method of claim 1,
    where the interactive television content includes a plurality of televised channels,
    where the instruction identifies a direction for the automatic scrolling, and
    where performing the automatic scrolling includes:
        automatically changing from one of the plurality of televised channels to another one of the plurality of televised channels in the direction.

10. A non-transitory computer-readable medium comprising:
    one or more instructions that, when executed by at least one processor, cause the at least one processor to:
        provide a list of items of television content for display on a display device;
        receive an instruction for initiating an autoscroll function,
            the instruction identifying a direction;
        retrieve configuration information that specifies whether automatic scrolling, based on the autoscroll function, is performed in a continuous manner or a non-continuous manner; and
        perform, based on the configuration information and the instruction, the automatic scrolling through at least a portion of the list of items of television content in the identified direction and in the continuous manner or the non-continuous manner.

11. The non-transitory computer-readable medium of claim 10,
    where the direction identifies one of a horizontal direction or a vertical direction,
    where the configuration information further specifies a first user-configurable speed for when the automatic scrolling is in the horizontal direction and a second user-configurable speed for when the automatic scrolling is in the vertical direction,
    where the first user-configurable speed is independent of the second user-configurable speed, and
    where the one or more instructions that cause the at least one processor to perform the automatic scrolling include:
        one or more instructions that, when executed by at least one processor, cause the at least one processor to:
            automatically scroll through the at least the portion of the list of items of television content, in the horizontal direction, at the first user-configurable speed when the direction identifies the horizontal direction, or
            automatically scroll through the at least the portion of the list of items of television content, in the vertical direction, at the second user-configurable speed when the direction identifies the vertical direction.

12. The non-transitory computer-readable medium of claim 10, further comprising:
    one or more instructions that, when executed by the at least one processor, cause the at least one processor to:

receive selection of an item in the list of items of television content; and
add information associated with the television content, corresponding to the selected item, to a bookmark list.

13. The non-transitory computer-readable medium of claim 10, further comprising:
one or more instructions to:
receive a particular instruction to change a direction of the automatic scrolling to a different direction; and
automatically scroll through the list of items of television content in the different direction based on the particular instruction.

14. A device comprising:
one or more processors to:
receive a request for interactive television content,
provide, based on the request, the interactive television content to a display device,
receive an instruction to initiate the autoscroll function,
retrieve, based on the instruction, a set of parameters that indicate whether automatic scrolling, based on the autoscroll function, is performed in a continuous manner or a non-continuous manner, and
perform the automatic scrolling through the interactive television content in the continuous manner or the non-continuous manner based on the set of parameters.

15. The device of claim 14,
where the set of parameters further indicate whether a horizontal automatic scroll is enabled or a vertical automatic scroll is enabled, and
where, when performing the automatic scrolling, the one or more processors are to:
automatically scroll through the interactive television content in a horizontal direction when the horizontal automatic scroll is enabled, or
automatically scroll through the interactive television content in a vertical direction when the vertical automatic scroll is enabled.

16. The device of claim 14,
where the set of parameters further indicate a speed for automatically scrolling, and
where, when performing the automatic scrolling, the one or more processors are to:
automatically scroll through the interactive television content at the speed.

17. The device of claim 14, where the processor is further to:
receive a particular instruction to change a direction of the automatic scrolling to a different direction; and
automatically scroll through the interactive television content in the different direction based on the particular instruction.

18. The device of claim 14,
where, when performing the automatic scrolling, the one or more processors are to:
automatically scroll through the interactive television content in a first direction; and
where the one or more processors are further to:
receive a particular instruction to change a direction of the automatic scrolling to a second direction; and
automatically scroll through the interactive television content in the second direction based on the particular instruction,
where the first direction is a vertical direction, and
where the second direction is a horizontal direction.

19. The device of claim 14,
where the interactive television content includes a list of items,
where the instruction identifies a direction for the automatic scrolling, and
where, when performing the automatic scrolling, the one or more processors are to:
move a selector from item-to-item, within the list of items, in the direction.

20. The device of claim 14, where, when receiving the instruction to initiate the autoscroll function, the one or more processors are to:
receive the instruction from a remote control device after a user pushes a button of the remote control device.

21. The device of claim 14, where, when receiving the instruction to initiate the autoscroll function, the one or more processors are to:
detect an occurrence of a particular event, and
generate the instruction to initiate the autoscroll function based on the occurrence of the particular event.

22. The device of claim 14,
where the interactive television content includes a list of items; and
where the one or more processors are further to:
receive selection of an item in the list of items, and
store information regarding the selected item in a bookmark list.

23. The device of claim 14,
where the interactive television content includes a plurality of broadcast television channels,
where the instruction identifies a direction for the automatic scrolling, and
where, when performing the automatic scrolling, the one or more processors are to:
automatically change from one of the plurality of broadcast television channels to another one of the plurality of broadcast television channels in the direction.

* * * * *